United States Patent [19]

Hovorka

[11] 4,258,279

[45] Mar. 24, 1981

[54] MAGNETIC SENSOR ASSEMBLY

[75] Inventor: Jiri J. Hovorka, Muskogee, Okla.

[73] Assignee: Orin W. Coburn

[21] Appl. No.: 939,446

[22] Filed: Sep. 5, 1978

[51] Int. Cl.³ .............................................. H02K 21/44
[52] U.S. Cl. ..................................... 310/155; 310/168
[58] Field of Search ................. 310/155, 168, 111;
324/170-174

[56] References Cited

U.S. PATENT DOCUMENTS

| | | | |
|---|---|---|---|
| 2,816,240 | 12/1957 | Zimmerman | 310/155 |
| 3,041,483 | 6/1962 | Ebbinghaus et al. | 310/155 X |
| 3,252,024 | 5/1966 | Loudon | 310/155 |
| 3,876,927 | 4/1975 | Gee et al. | 310/155 X |
| 4,011,478 | 3/1977 | Reenstra | 310/155 |

Primary Examiner—Donovan F. Duggan
Attorney, Agent, or Firm—Dunlap, Codding & McCarthy

[57] ABSTRACT

An improved magnetic sensor assembly comprising a permanent magnet recessed within a pole extension magnet with a pick-up coil disposed around a portion of the pole extension magnet, each of the permanent and pole extension magnets having one end thereof substantially coplanar. The sensor assembly may be enclosed within a magnetic shield having an access opening providing access to the sensing region of the sensor assembly.

9 Claims, 4 Drawing Figures

MAGNETIC SENSOR ASSEMBLY

CROSS-REFERENCE TO RELATED APPLICATION

The subject matter of this application is related to that disclosed in the co-pending U.S. patent application Ser. No. 708,120 entitled "Magnetic Coin Element Sensor", filed July 23, 1976 by the same inventor and assigned to the same assignee.

BACKGROUND OF THE INVENTION

1. Field of the Invention

The present invention relates generally to magnetic sensor assemblies and, more particularly, but not by way of limitation, to an improved magnetic sensor assembly wherein a pole extension magnet has a permanent magnet disposed within a recess therein and a pick-up coil disposed therearound for providing output signals proportional to variations in the magnetic flux emanating from the pole extension magnet.

2. Prior Art Statement

Although various types of magnetic sensor assemblies have been proposed and employed in the past, the only known application of pole extension magnets of the type disclosed herein is shown and described in the co-pending U.S. patent application Ser. No. 708,120, filed by the same inventor and assigned to the same assignee.

SUMMARY OF THE INVENTION

An improved magnetic sensor assembly comprising a permanent magnet disposed in a recess formed within a pole extension magnet with one end of the pole extension magnet being co-planar with, and enclosing at a spaced distance therearound, one end of the permanent magnet, with a pick-up coil being disposed coaxially around a portion of the pole extension magnet for providing output signals proportional to variations in the magnetic flux emanating therefrom.

An object of the present invention is to provide an improved magnetic sensor assembly for providing output signals proportional to magnetic flux variations induced via the passage of materials past a portion of the sensor assembly.

Another object of the present invention is to provide an improved magnetic sensor assembly for providing output signals uniquely indicative of the passage of either ferrous or non-ferrous materials past a portion of the sensor assembly.

Still another object of the present invention is to provide an improved magnetic sensor assembly employing a pole extension magnet having a recess formed therein for receiving a permanent magnet with one end of the pole extension magnet being substantially co-planar with, but spaced a distance around, one pole of the permanent target.

A further object of the present invention is to provide a magnetic shield having a recess formed therein sized to receive and substantially enclose magnetic sensor assemblies and the like.

Other objects and advantages of the present invention will be evident from the following detailed description when read in conjunction with the accompanying drawings which illustrate various embodiments of the invention.

DESCRIPTION OF THE PREFERRED EMBODIMENT

Figure 1:
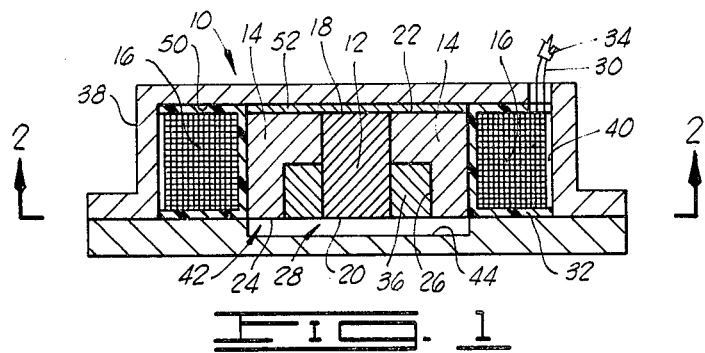
FIG. 1 is a cross-sectional view of an improved magnetic sensor assembly constructed in accordance with the preferred embodiment of the present invention.
Figure 2:
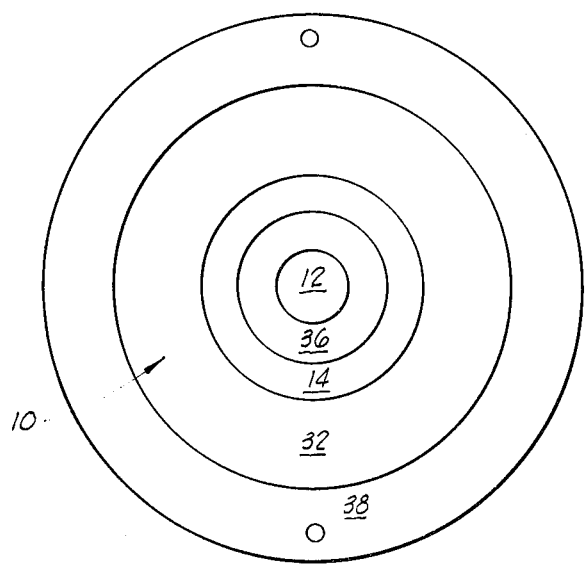
FIG. 2 is a cross-sectional view of the sensor assembly of FIG. 1 taken along the line 2—2.

Referring to the drawings in general and to FIGS. 1 and 2 in particular, shown therein and referred to by the general reference numeral 10 is an improved magnetic sensor assembly constructed in accordance with the preferred embodiment of the present invention. The magnetic sensor assembly 10 is comprised generally of a permanent magnet 12, a pole extension magnet 14, and a pick-up coil 16.

The permanent magnet 12 has a first end 18 of first polarity, and a second end 20 of second, opposite polarity. In general, the first and second ends 18 and 20, respectively, are each substantially planar and are disposed generally perpendicular to the longitudinal axis of the permanent magnet 12. Although the permanent magnet 12 may have any desired cross-sectional shape, the generally cylindrical form shown in the drawings has been found to be particularly convenient.

The pole extension magnet 14 has a first end 22 and a second end 24, the first and second ends 22 and 24, respectively, being substantially planar and disposed generally perpendicular to the longitudinal axis of the pole extension magnet 14. In addition, the pole extension magnet 14 has an axial recess 26 formed therein which extends generally between the first and second ends 22 and 24, respectively, thereof, for receiving the permanent magnet 12. More particularly, the portion of the recess 26 adjacent the first end 22 of the pole extension magnet 14 is sized to snugly engage the periphery of the first end 18 of the permanent magnet 12, while the portion of the recess 26 adjacent the second end 24 of the pole extension magnet 14 is substantially larger in cross-sectional area so as to generally enclose the second end 20 of the permanent magnet 12 at a spaced distance therearound. In the preferred form, the permanent magnet 12 is disposed in the recess 26 of the pole extension magnet 14 with the second end 24 of the pole extension magnet 14 and the second end 20 of the permanent magnet 12 being substantially coplanar.

For the purposes of this description, the term "pole extension magnet" may be defined as a ferrous material which will, in the presence of a magnetic field predominantly of one polarity, exhibit an induced polarization corresponding to said predominant polarity throughout the entire body of material. For example, it has been discovered that a very low carbon steel material having less than about 1% carbon, such as the low carbon steel commercially available as S.A.E. 1010, exhibits such characteristics, particularly when the carbon content thereof has been reduced by heat treating to less than about 0.01% carbon. In this manner, the close engagement between the first end 22 of the pole extension magnet 14 and the first end 18 of the permanent magnet 12 results in the polarization of the entire pole extension magnet 14 to the polarity of the first end 18 of the permanent magnet 12. Accordingly, the second end 24 of the pole extension magnet 14 will have a polarity opposite that of the second end 20 of permanent magent 12. This close proximity of opposite polarities results in a relatively high magnet flux density in a sensing region 28 between, and adjacent to, the second ends 20 and 24 of the permanent and pole extension magnets 12 and 14, respectively.

The pick-up coil 16 is disposed generally coaxially around a portion of the periphery of the pole extension magnet 14, and thus will be linked thereto via the magnetic flux emanating therefrom. As will be clear to those skilled in the art, the pick-up coil 16 will provide output signals, in the form of low level electrical currents, proportional to variations in the magnetic flux in the region occupied thereby. In the preferred form, the pick-up coil 16 is comprised of a relatively high number of ampere-turns of a relatively small, insulated wire 30 wound on a plastic or phenolic spool 32. The ends of the wire 30 are preferably connected to detection circuitry (not shown) via a shielded cable 34.

If desired, a magnetic reluctor 36 may be interposed in the space between the second end 20 of the permanent magnet 12 and the second end 24 of the pole extension magnet 14. For the purposes of this description, a "magnetic reluctor" is defined as a material which exhibits significant magnetic reluctance to the flow of magnetic flux therethrough. This characteristic, which is well known in the art, may be considered analogous to the electrical resistance exhibited by a resistor to the flow of electrical currents therethrough. For example, the magnetic reluctor 36 may be formed of either copper or aluminum, since such metals normally exhibit significant magnetic reluctance. In this form, a significant portion of the lines of magnetic force which would normally extend generally across the space between the second ends 20 and 24 of the permanent and pole extension magnets 12 and 14, respectively, will tend to be "diverted" by the magnetic reluctor 36 so as to arch outwardly between said second ends. The resultant increase in magnetic flux density in the sensing region 28 improves the sensitivity of the magnetic sensor assembly 10.

In those situations when the magnetic sensor assembly 10 must operate in a "magnetically noisy" environment, the magnetic sensor assembly 10 may include a magnetic shield 38 having a recess 40 formed therein sized to receive and substantially enclose the assembled pick-up coil 16, pole extension magnet 14, and permanent magnet 12. To facilitate operation of the magnetic sensor assembly 10, the magnetic shield 38 will be provided with an access opening 42 formed therein generally adjacent to the second ends 20 and 24 of the permanent and pole extension magnets 12 and 14, respectively, so as to provide access to the sensing region 28. For the purposes of this description, the magnetic shield 38 is preferably formed from a high carbon steel having at least about 10% carbon and preferably on the order of about 30% carbon. For example, a high carbon steel commercially available as S.A.E. 1095 has been found to exhibit satisfactary magnetic shielding properties.

Figure 3:
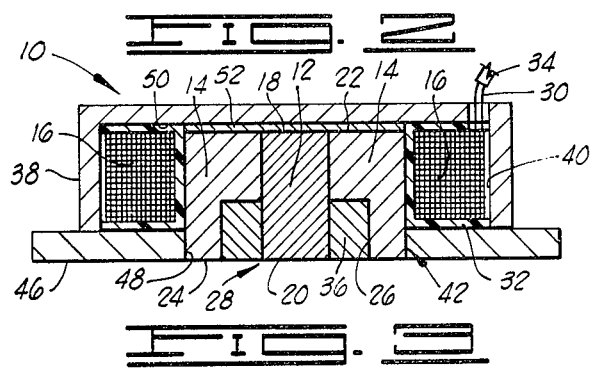
FIG. 3 is a cross-sectional view of a modified form of the magnetic sensor assembly shown in FIG. 1.
Figure 4:
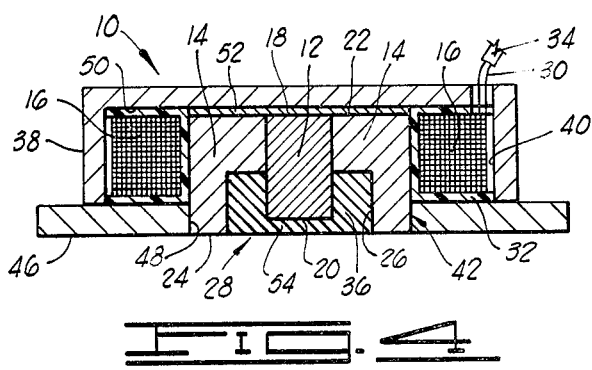
FIG. 4 is a cross-sectional view of another modified form of the magnetic sensor assembly shown in FIG. 1.

In the preferred form shown in FIG. 1, the access opening 42 comprises a slot 44 of predetermined width and thickness extending through the magnetic shield 38 adjacent to the plane of the second ends 20 and 24 of the permanent and pole extension magnets 12 and 14, respectively, with the longitudinal axis of the slot 44 extending orthogonal to the longitudinal axes of the permanent and pole extension magnets 12 and 14, respectively. In the modified forms shown in FIGS. 3 and 4, the magnetic shield 38 has one outer surface 46 generally coplanar with the second ends 20 and 24 of the permanent and pole extension magnets 12 and 14, respectively. In these forms, the access opening 42 comprises a port 48 extending perpendicularly through the surface 46 coaxially with the axes of the permanent and pole extension magnets 12 and 14, respectively, the port 48 being sized to snugly engage the periphery of the second end 24 of the pole extension magnet 14.

It has been determined that the magnetic shield 38 is particularly effective when an inner surface 50 thereof engages the first ends 18 and 22 of the permanent and pole extension magnets 12 and 14, respectively, so that the magnetic shield 38 becomes generally polarized to the same polarity as the first end 8 of the permanent magnet 12. If so desired, the degree of polarization may be controlled by interposing a magnetic reluctor 52 of predetermined thickness between the surface 50 of the magnetic shield 38 and the first ends 18 and 22 of the permanent and pole extension magnets 12 and 14, respectively.

In those situations when it is desired to employ the magnetic sensor assembly 10 to provide output signals in response to both ferrous and non-ferrous materials, the magnetic flux density in the sensing region 28 may be reduced by recessing the second end 20 of the permanent magnet 12 a predetermined small distance relative to the plane of the second end 24 of the pole extension magnet 14. If desired, the magnetic flux density may be further reduced by interposing a magnetic reluctor 54 in the resulting space between the second end 20 of the permanent magnet 12 and the plane of the second end 24 of the pole extension magnet 14.

In operation, the passage of substantially any type of material through the sensing region 28 will induce fluctuations of variations in the magnetic flux linking the pick-up coil 16 to the pole extension magnet 14. Such variations will induce proportional electrical currents in the wire 30. Depending upon the sensitivity and response time of the detecting circuitry (not shown), such electrical currents may be measured to provide unique indications of the sensed material.

As will be clear to those skilled in the art, the generally annular configuration of the pole extension magnet 14 relative to the permanent magnet 12 in the preferred forms illustrated herein results in a generally hemitoroidal magnetic field in the sensing region 28. While this configuration has been determined to be highly effective and generally convenient to manufacture, variations can be made in the shape or arrangement of the parts or elements of the preferred embodiments as disclosed herein without departing from the spirit and scope of the invention as defined in the following claims.

What is claimed is:
1. A magnetic sensor assembly comprising:
a permanent magnet having a first end of first polarity and a second end of second polarity;
a pole extension magnet having an axial recess formed therein for receiving the permanent magnet with a first end of the pole extension magnet engaging a portion of the permanent magnet generally near the first end of the permanent magnet, and a second end of the pole extension magnet enclosing a portion of the permanent magnet generally near the second end of the permanent magnet at a spaced distance therearound, the second end of the pole extension magnet and the second end of the permanent magnet being substantially coplanar; and a pick-up coil disposed coaxially around a portion of the periphery of the pole extension magnet and linked thereto via the magnetic flux emanating therefrom, the pick-up coil providing output signals proportional to variations in said magnetic flux.

2. A magnetic sensor assembly comprising:

a permanent magnet having a first end of first polarity and a second end of second polarity;

a pole extension magnet having an axial recess formed therein for receiving the permanent magnet with a first end of the pole extension magnet engaging a portion of the permanent magnet generally near the first end of the permanent magnet, and a second end of the pole extension magnet enclosing a portion of the permanent magnet generally near the second end of the permanent magnet at a spaced distance therearound, the second end of the pole extension magnet and the second end of the permanent magnet being substantially coplanar;

a pick-up coil disposed coaxially around a portion of the periphery of the pole extension magnet and linked thereto via the magnetic flux emanating therefrom, the pick-up coil providing output signals proportional to variations in said magnetic flux; and a magnetic reluctor interposed in the space between the second end of the permanent magnet and the second end of the pole extension magnet.

3. A magnetic sensor assembly comprising:

a permanent magnet having a first end of first polarity and a second end of second polarity;

a pole extension magnet having an axial recess formed therein for receiving the permanent magnet with a first end of the pole extension magnet engaging a portion of the permanent magnet generally near the first end of the permanent magnet, and a second end of the pole extension magnet enclosing a portion of the permanent magnet generally near the second end of the permanent magnet at a spaced distance therearound, the second end of the pole extension magnet and the second end of the permanent magnet being substantially coplanar;

a pick-up coil disposed coaxially around a portion of the periphery of the pole extension magnet and linked thereto via the magnetic flux emanating therefrom, the pick-up coil providing output signals proportional to variations in said magnetic flux; and a magnetic shield having a recess formed therein sized to receive and substantially enclose the pick-up coil, pole extension magnet and permanent magnet, the magnetic shield having an access opening formed therein adjacent to the second ends of the permanent and pole extension magnets.

4. The magnetic sensor assembly of claim 3 wherein the access opening of the magnetic shield comprises a slot of predetermined width and thickness extending through the magnetic shield adjacent to the plane of the second ends of the permanent and pole extension magnets with the longitudinal axis of the slot extending orthogonal to the longitudinal axes of the permanent and pole extension magnets.

5. The magnetic sensor assembly of claim 3 wherein the magnetic shield has one outer surface generally coplanar with the second ends of the permanent and pole extension magnets; and wherein the access opening comprises a port extending perpendicularly through said one outer surface coaxially with the axes of the permanent and pole extension magnets, the port being sized to engage the periphery of the second end of the pole extension magnet.

6. The magnetic sensor assembly of claim 3 wherein the magnetic shield has one inner surface engaging the first end of the pole extension magnet, whereby the magnetic shield is polarized to the same polarity as the first end of the permanent magnet.

7. The magnetic sensor assembly of claim 6 further comprising:

a magnetic reluctor interposed between the one inner surface of the magnetic shield and the first ends of the permanent and pole extension magnets.

8. The magnetic sensor assembly of claim 3 further comprising:

a magnetic reluctor interposed in the space between the second end of the permanent magnet and the second end of the pole extension magnet.

9. A magnetic sensor assembly comprising:

a permanent magnet having a first end of first polarity and a second end of second polarity;

a pole extension magnet having an axial recess formed therein for receiving the permanent magnet with a first end of the pole extension magnet engaging a portion of the permanent magnet generally near the first end of the permanent magnet, and a second end of the pole extension magnet enclosing a portion of the permanent magnet generally near the second end of the permanent magnet at a spaced distance therearound, the second end of the pole extension magnet and the second end of the permanent magnet being substantially coplanar, the second end of the permanent magnet being recessed a predetermined small distance relative to the plane of the second end of the pole extension magnet;

a pick-up coil disposed coaxially around a portion of the periphery of the pole extension magnet and linked thereto via the magnetic flux emanating therefrom, the pick-up coil providing output signals proportional to variations in said magnetic flux; and a magnetic reluctor interposed in the space between the second end of the permanent magnet and the plane of the second end of the pole magnet.

* * * * *